United States Patent [19]

Richard

[11] Patent Number: 5,101,460
[45] Date of Patent: Mar. 31, 1992

[54] SIMULTANEOUS BIDIRECTIONAL OPTICAL INTERCONNECT

[75] Inventor: Fred V. Richard, Scottsdale, Ariz.

[73] Assignee: Motorola, Inc., Schaumburg, Ill.

[21] Appl. No.: 577,383

[22] Filed: Sep. 4, 1990

[51] Int. Cl.⁵ .............................................. G02B 6/26
[52] U.S. Cl. ..................................... 385/37; 385/14;
385/33; 385/39; 385/50; 385/24; 359/15;
359/19
[58] Field of Search ....................... 350/3.6, 3.7, 3.72,
350/3.73, 96.11, 96.12, 96.13, 96.14, 96.15,
96.16, 96.19; 359/15, 16, 19, 20; 385/14, 15, 31,
33, 37, 39, 49, 50, 24

[56] References Cited

U.S. PATENT DOCUMENTS

| | | | |
|---|---|---|---|
| 4,671,603 | 6/1987 | McQuoid et al. | 350/3.7 |
| 4,939,793 | 7/1990 | Stewart | 350/3.72 X |
| 4,946,253 | 8/1990 | Kostuck | 350/96.19 X |

Primary Examiner—John D. Lee
Attorney, Agent, or Firm—Joe E. Barbee

[57] ABSTRACT

An optical interconnect system facilitates the simultaneous bi-directional transfer of data between facing integrated circuits. The laser simultaneously emits two oppositely directed continuous beams of light. Holographic elements placed in the paths of the beams of light split each into multiple light beams, creating independent optical communication channels. Reflective modulators are positioned on integrated circuits in the path of each communication channel to selectively reflect the respective light beams. The light beams are modulated in response to data input to the reflective modulators from the integrated circuits. Opto-electronic receivers are positioned on the integrated circuits in the path of the light beams reflected by the reflective modulators. Holographic elements focus each reflected light beams onto an opto-electronic receiver. Data is extracted from the light beams by the opto-electronic receivers and output to the integrated circuits. Each integrated circuit can thus simultaneously transmit and receive data.

13 Claims, 3 Drawing Sheets

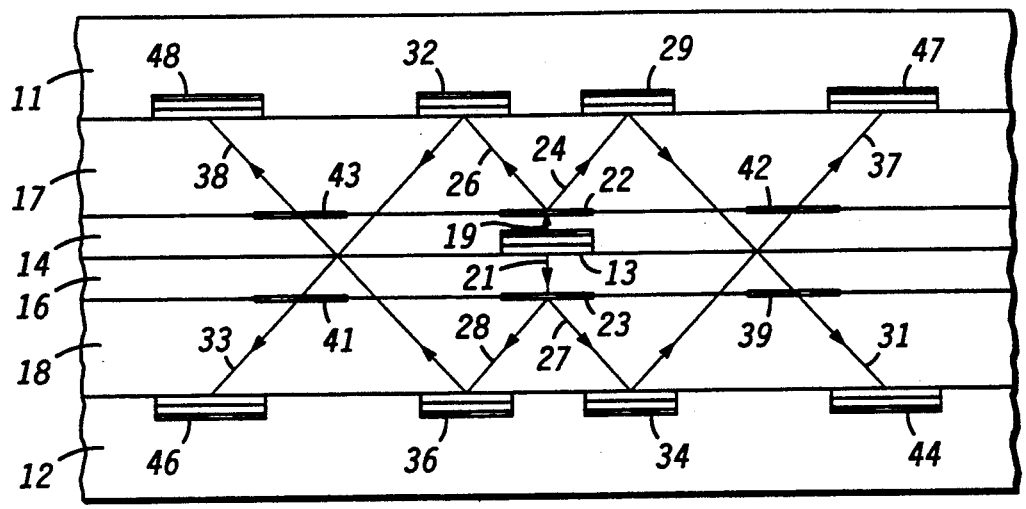
FIG. 1
FIG. 2
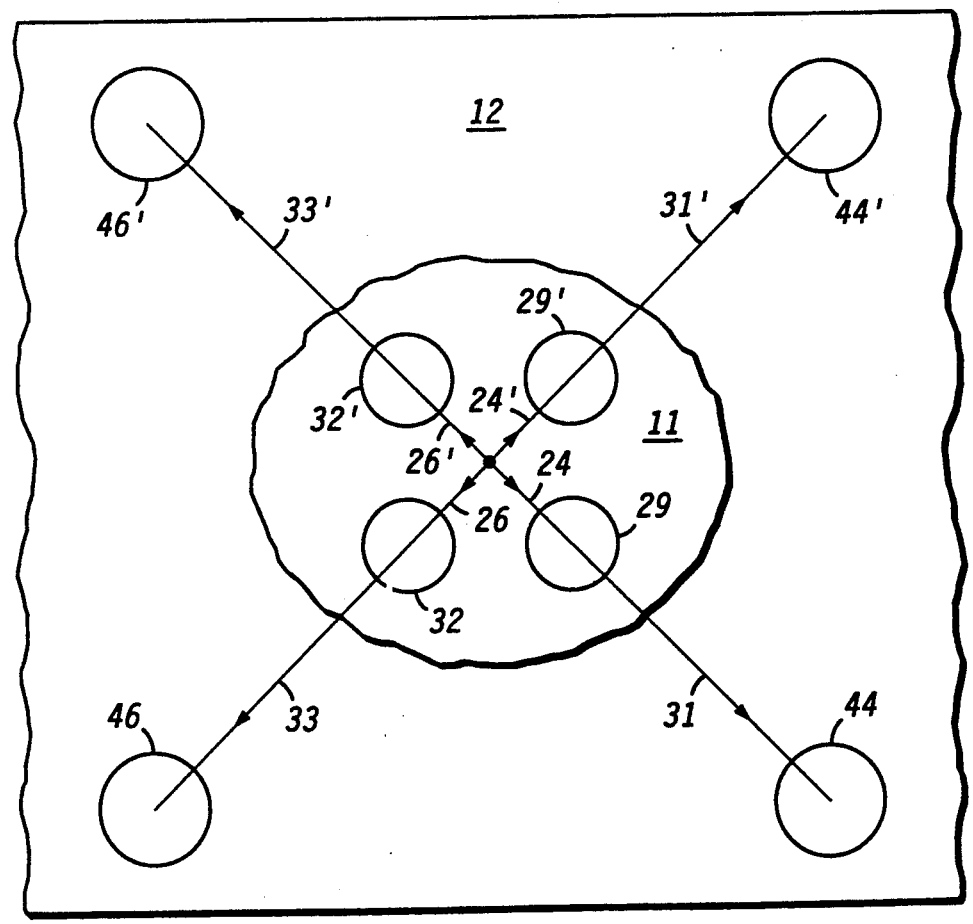

SIMULTANEOUS BIDIRECTIONAL OPTICAL INTERCONNECT

BACKGROUND OF THE INVENTION

The present invention relates, in general, to optical coupling of integrated circuits and, more particularly, to a system providing for the simultaneous bidirectional transfer of data between integrated circuits by means of modulated light beams.

Historically, interconnection between integrated circuits was limited to a two dimensional plane. Buses of parallel metal lines on a printed circuit board carried data from one circuit to another. Data to be transferred to adjacent boards in a system had to travel to the edge of the board, exit into a back plane, travel to the next board, and then to the destination integrated circuit. Simultaneous bidirectional communication was only possible if the width of the bus were doubled, doubling the complexity of the interconnection. Typical applications provided for bus arbitration to determine when the bus was clear, allowing data transmission in opposite directions.

Associated with each line was an inherent capacitance between the line and the ground plane, and an additional capacitance between adjacent lines. At relatively low clock speeds, capacitive loading was not a significant factor. However, as applications began to push clock speeds into the few hundred megahertz range and beyond, the inhibiting effects of the capacitance between interconnection lines and the ground plane, and of the capacitance between adjacent interconnection lines, became significant. Propagation delays due to capacitive loading effects became a limiting factor to circuit performance by limiting circuit speed and increasing circuit cross talk.

Additionally, wide data buses were plagued by simultaneous switching noise. Simultaneous switching noise was related to the parasitic inductances associated with power and ground interconnections to the bus. The level of the simultaneous switching noise was determined by the parasitic inductance, the width of the bus, and the rate of change of the drive current that charged up the interconnect lines. Finally, at relatively high frequencies, impedance matching terminations became necessary on interconnect lines to decrease signal settling time, thus adversely affecting the efficiency of data transfer due to increased power dissipation in the terminating impedance.

In order to overcome the limitations imposed by circuit interconnection, the use of optical interconnection was introduced. A number of optical interconnect approaches were advanced by Goodman, et. al., "Optical Interconnections for VLSI Systems", Proceedings of IEEE, vol 72, No.7, July 1984. One approach consisted of a number of opto-electronic transmitters, normally lasers, placed near the edge of an integrated circuit. The opto-electronic transmitters aimed beams of light at a holographic routing element located above the integrated circuit. The beams of light were modulated such that the beams of light contained the data to be transferred. The holographic routing element selectively diffracted the beams of light back to opto-electronic receivers on the surface of the integrated circuit.

Another approach, more typically used for a clock signal as opposed to data transfer, consisted of an opto-electronic transmitter located above an integrated circuit. Between the opto-electronic transmitter and the integrated circuit was located a holographic routing element. The opto-electronic transmitter emitted a modulated signal which was aimed by the holographic routing element onto opto-electronic receivers on the surface of the integrated circuit.

Still another approach utilized optical waveguides as described by Kapany and Burke, *Optical Wave Guides*, Academic Press, 1972. In this approach, the emissions of the opto-electronic transmitter were guided to an opto-electronic receiver by a fiber optic waveguide, a channel optical waveguide, or a planar optical waveguide.

Each of these approaches had limitations. The interface between the integrated circuit and the optical fiber was difficult to fabricate. This, and the physical size of the optical fiber, limited its use in many applications. Though channel waveguides were efficient for single data lines, buses were difficult to fabricate due to physical size constraints. The channel waveguide, as well as the planar optical waveguide, tended to be limited to a two dimensional plane. Conventional bussing was still required, and simultaneous bi-directional communication remained impractical.

SUMMARY OF THE INVENTION

The objects and advantages of the present invention are provided by an optical interconnect system which facilitates the simultaneous bi-directional transfer of data between integrated circuits. An opto-electronic transmitter simultaneously emits a continuous beam of light in two opposite directions, toward at least two facing integrated circuits. Holographic diffractive elements placed in the paths of the two beams of light split each into a plurality of light beams, creating several independent optical communication channels. Reflective modulators are positioned on the integrated circuits in the path of each independent optical communication channel so as to selectively reflect the respective light beams. The light beams are thus modulated in response to data input to the reflective modulators from the integrated circuits. One opto-electronic receiver corresponding to each reflective modulator is positioned on the integrated circuits in the path of the light beam reflected by the corresponding reflective modulator. Holographic focus elements are placed in the path of each reflected light beam, focusing each reflected light beam onto the corresponding opto-electronic receiver. Data is extracted from the light beams by the opto-electronic receivers and output to the integrated circuits. Each integrated circuit can thus simultaneously transmit and receive data without bus contention.

BRIEF DESCRIPTION OF THE DRAWINGS

FIG. 1 is a cross sectional view illustrating an embodiment of the present invention interconnecting two integrated circuits;

FIG. 2 is a planform view illustrating the relative positions of the reflective modulators and the opto-electronic receivers in an embodiment of the present invention;

DETAILED DESCRIPTION OF THE DRAWINGS

Figure 3:
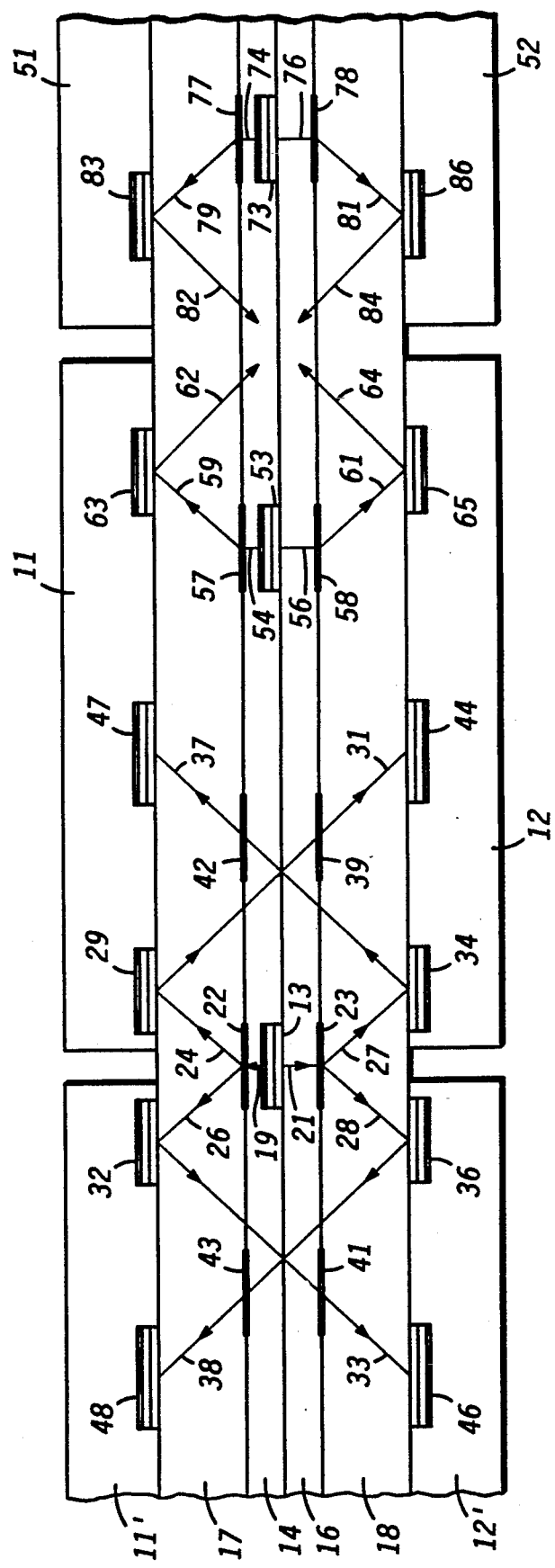
FIG. 3 is a cross sectional view illustrating an alternate embodiment of the present invention interconnecting multiple integrated circuits.

The simultaneous bi-directional optical interconnect system consists of two or more integrated circuits, represented in FIG. 1 by integrated circuits 11 and 12, that face one another with a uniform separation. An opto-electronic transmitter 13 incorporating a surface emitting laser, configured to emit in both vertical directions, similar to those described by K. Iga, et. al., "Surface Emitting Semiconductor Lasers", IEEE Journal of Quantum Electronics, vol 24, No. 9, Sept. 1988, is located midway between facing integrated circuits 11 and 12. Opto-electronic transmitter 13 is supported by optically transparent layer 14. Opto-electronic transmitter 13 may be fabricated as an integral part of optically transparent layer 14. In such a case, optically transparent layer 14 could be an indium phosphide or gallium arsenide substrate upon which opto-electronic transmitter 13 is fabricated as an indium phosphide laser, or as a gallium arsenide laser with an indium gallium arsenide active layer. Alternately, opto-electronic transmitter 13 may be fabricated independently using any suitable technology, and mounted within any suitable optically transparent layer 14. Optically transparent layer 16 is attached to optically transparent layer 14, covering opto-electronic transmitter 13. Optically transparent layer 16 is made from a suitable optically transparent material. Optically transparent layer 17 separates optically transparent layer 14 from the surface of integrated circuit 11. Optically transparent layer 18 separates optically transparent layer 16 from the surface of integrated circuit 12. Optically transparent layers 17 and 18 can be fabricated from any suitable optically transparent material. Alternately, optically transparent layers 17 and 18 may represent air gaps between integrated circuits 11 and 12 and optically transparent layers 14 and 16. If layers 17 and 18 represent air gaps, appropriate anti-reflection coatings need to be applied to the outward surfaces of layers 14 and 16 in order to prevent multiple reflections of the beams. If layers 17 and 18 are solid transparent layers, anti-reflection coatings at the interface between layers 17 and 18 and the reflective modulators or receivers are also desirable to prevent unwanted reflections.

Opto-electronic transmitter 13 emits bidirectionally, one beam of light, 19, being directed toward integrated circuit 11, and another beam of light, 21, being directed toward integrated circuit 12. Holographic diffractive element 22 is placed at the interface between optically transparent layers 14 and 17 in the path of beam of light 19. Holographic diffractive element 23 is placed at the interface between optically transparent layers 16 and 18 in the path of beam of light 21. Holographic diffractive elements 22 and 23 are similar to those described by Howard M. Smith, *Principles of Holography*, Wiley and Sons, 1969. They may be made of dichromated gelatin film, photosensitive polymer film, gratings etched photolithographically directly into optically transparent layers 14 and 16, or by any other suitable means. Beam of light 19 is split by holographic diffractive element 22 into a plurality of light beams. In a preferred embodiment, beam of light 19 is easily split into four light beams by means of a multiply-exposed dichromated gelatin holographic element (one exposure for each beam direction). Two of these light beams, 24 and 26, are depicted in FIG. 1. Since FIG. 1 is a two dimensional drawing, the other two light beams are obscured in FIG. 1 by light beams 24 and 26. Similarly, beam of light 21 is split by holographic diffractive element 23 into a plurality of light beams, with a preferred embodiment of four light beams. Two of these light beams, 27 and 28, are depicted in FIG. 1. Again, since FIG. 1 is a two dimensional drawing, the other two light beams are obscured in FIG. 1 by light beams 27 and 28.

Reflective modulator 29 is electrically coupled to integrated circuit 11. The reflectivity of reflective modulator 29 is modulated by data input to reflective modulator 29 by integrated circuit 11. Reflective modulator 29 is positioned so that light beam 24 is reflected back toward integrated circuit 12 as modulated light beam 31. In the same manner, reflective modulator 32 is electrically coupled to integrated circuit 11. The reflectivity of reflective modulator 32 is modulated by data input to reflective modulator 32 by integrated circuit 11. Reflective modulator 32 is positioned so that light beam 26 is reflected back toward integrated circuit 12 as modulated light beam 33. At the same time, reflective modulators 34 and 36, coupled to integrated circuit 12, reflect light beams 27 and 28 back toward integrated circuit 11 as modulated light beams 37 and 38. Modulated light beams 37 and 38 thus are modulated by reflective modulators 34 and 36 based upon data input to reflective modulators 34 and 36 by integrated circuit 12. Reflective modulators 29, 32, 34, and 36 are similar to reflective modulators described by Yan, Simes, and Coldren, "Analysis and Design of Surface-normal Fabry-Perot Electrooptic Modulators", IEEE Journal of Quantum Electronics, vol 25, No. 11, p. 2272, Nov 89.

Each of modulated light beams 31, 33, 37, and 38 is focused upon an opto-electronic receiver similar to those described by H. Kressel, *Semiconductor Devices, Topics in Applied Physics*, vol 39, Springer Verlag, 1982, by a holographic focus element 39, 41, 42, or 43. Holographic focus elements 39 and 41 are placed in the paths of modulated light beams 31 and 33 at the interface between optically transparent layers 16 and 18. Holographic focus elements 42 and 43 are placed in the paths of modulated light beams 37 and 38 at the interface between optically transparent layers 14 and 17. Thus, modulated light beam 31 is focused upon opto-electronic receiver 44 by holographic focus element 39. Modulated light beam 33 is focused upon opto-electronic receiver 46 by holographic focus element 41. Modulated light beam 37 is focused upon opto-electronic receiver 47 by holographic focus element 42. Modulated light beam 38 is focused upon opto-electronic receiver 48 by holographic focus element 43. These holographic focus elements are similar to those described by Howard M. Smith, *Principles of Holography*, Wiley and Sons, 1969. They may be made of dichromated gelatin film, photosensitive polymer film, gratings etched photolithographically directly into the surfaces of optically transparent layers 14 and 16, or any other suitable means. Opto-electronic receivers 44 and 46, coupled to integrated circuit 12, extract the data from modulated light beams 31 and 33, respectively, and output the data to integrated circuit 12. Opto-electronic receivers 47 and 48, coupled to integrated circuit 11, extract the data from modulated light beams 37 and 38, respectively, and output the data to integrated circuit 11. In this manner, data is simultaneously transferred from integrated circuit 11 to integrated circuit 12, and from integrated circuit 12 to integrated circuit 11. The reflective modulators and opto-electronic receivers are fabricated from indium phosphide or gallium arsenide based materials that are epitaxially grown on or otherwise attached to the integrated circuits.

An alternate embodiment of FIG. 1 mounts reflective modulators 29 32, 34, and 36 and opto-electronic receivers 44, 46, 47, and 48 directly upon layers 17 and 18, forming an interconnect structure. In such a case, electrical contacts for reflective modulators 29 32, 34, and 36 and opto-electronic receivers 44, 46, 47, and 48 face outward from layers 17 and 18, thus allowing integrated circuits 11 and 12 to be attached to the interconnect structure using solder bump technology.

FIG. 2 illustrates the relative positions of one set of reflective modulators and opto-electronic receivers. A cut away portion of integrated circuit 11 is shown overlaying integrated circuit 12 in order to more clearly illustrate the multiple layers of the embodiment of FIG. 1. Light beam 19 of FIG. 1 is split into four light beams 24, 24', 26, and 26'. The four light beams are reflected as modulated light beams 31, 31', 33, and 33' by reflective modulators 29, 29', 32, and 32', respectively. Data input to the reflective modulators by integrated circuit 11 of FIG. 1 is transferred to opto-electronic receivers 44, 44',46, and 46', which are coupled to integrated circuit 12 of FIG. 1. Beam of light 21 of FIG. 1 is similarly split into four light beams which are modulated, reflected, and received to transfer data from integrated circuit 12 to integrated circuit 11.

Figure 4:
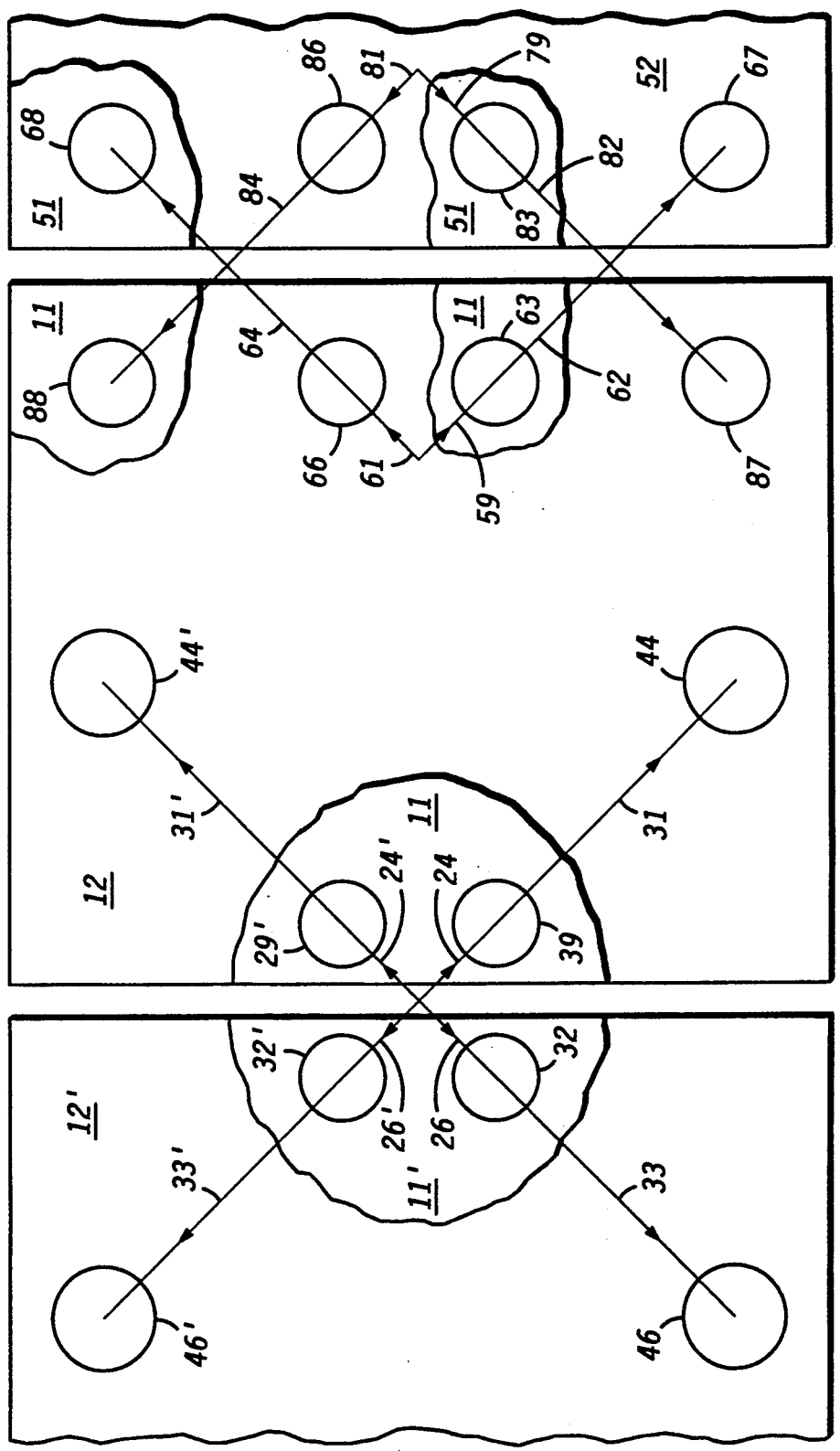
FIG. 4 is a planform view illustrating the relative positions of the reflective modulators and the opto-electronic receivers in the alternate embodiment of the present invention.

FIG. 3 illustrates an embodiment of the present invention wherein interconnection is provided among six integrated circuits 11, 11', 12, 12', 51, and 52. FIG. 4 shows cut away portions of integrated circuits 11, 11', and 51 overlaying integrated circuits 12, 12' and 52 in order to better illustrate the multiple layers of the alternate embodiment of FIG. 3.

Integrated circuit 11 of FIG. 1 is divided into integrated circuits 11, and 11' in FIG. 3. Integrated circuit 12 of FIG. 1 is divided into integrated circuits 12, and 12' in FIG. 3. Opto-electronic transmitter 13 is positioned such that light beams 24 and 27 provide interconnection between integrated circuits 11 and 12, while light beams 26 and 28 provide interconnection between integrated circuits 11' and 12'. Otherwise, the function of the interconnection between integrated circuits 11 and 12 and between integrated circuits 11' and 12' is similar to the discussion of FIG. 1 and FIG. 2.

Interconnection between integrated circuits 11 and 52 and between integrated circuits 12 and 51 is also illustrated in FIG. 3 and FIG. 4. Bidirectional optoelectronic transmitter 53 emits continuous beams of light 54 and 56, which are split into four light beams by holographic diffractive elements 57 and 58, as previously described for bidirectional opto-electronic transmitter 13, beams of light 19 and 21, and holographic diffractive elements 22 and 23. Only one light beam, 59, diffracted by holographic diffractive element 57 and one light beam, 61, diffracted by holographic diffractive element 58 are depicted in FIG. 3. The other light beams would also be available for use as appropriate to the application.

Light beam 59 is modulated and reflected as modulated light beam 62 by reflective modulator 63. Reflective modulator 63 is coupled to integrated circuit 11, from which it receives data used to modulate light beam 59. Light beam 61 is modulated and reflected as modulated light beam 64 by reflective modulator 66. Reflective modulator 66 is coupled to integrated circuit 12, from which it receives data used to modulate light beam 61. The required holographic focus elements that focus modulated light beam 62 onto opto-electronic receiver 67 (FIG. 4) and focus modulated light beam 64 onto opto-electronic receiver 68 (FIG. 4) are not depicted in FIGS. 3 or 4 because of the limitations of the two-dimensional drawing. For this same reason, opto-electronic receiver 67, which couples to integrated circuit 52, and opto-electronic receiver 68, which couples to integrated circuit 51, are also not depicted in FIG. 3.

Bidirectional opto-electronic transmitter 73 emits continuous beams of light 74 and 76, which are split into four light beams by holographic diffractive elements 77 and 78, as previously described for bidirectional opto-electronic transmitter 53, beams of light 54 and 56, and holographic diffractive elements 57 and 58. Only one light beam, 79, diffracted by holographic diffractive element 77 and one light beam, 81, diffracted by holographic diffractive element 78 are depicted in FIG. 3. The other light beams would also be available for use as appropriate to the application.

Light beam 79 is modulated and reflected as modulated light beam 82 by reflective modulator 83. Reflective modulator 83 is coupled to integrated circuit 51, from which it receives data used to modulate light beam 79. Light beam 81 is modulated and reflected as modulated light beam 84 by reflective modulator 86. Reflective modulator 86 is coupled to integrated circuit 52, from which it receives data used to modulate light beam 81. The required holographic focus elements that focus modulated light beam 82 onto opto-electronic receiver 87 (FIG. 4) and focus modulated light beam 84 onto opto-electronic receiver 88 (FIG. 4) are not depicted in FIGS. 3 or 4 because of the limitations of the two-dimensional drawing. For this same reason, opto-electronic receiver 87, which couples to integrated circuit 12, and opto-electronic receiver 88, which couples to integrated circuit 11, are also not depicted in FIG. 3.

In this manner, data from integrated circuit 11 is transferred to integrated circuit 52 by reflective modulator 63, modulated light beam 62, and opto-electronic receiver 67. Data is simultaneously transferred from integrated circuit 52 to integrated circuit 11 by reflective modulator 86, modulated light beam 84, and optoelectronic receiver 88. At the same time, data from integrated circuit 51 is transferred to integrated circuit 12 by reflective modulator 83, modulated light beam 82, and opto-electronic receiver 87. Data is simultaneously transferred from integrated circuit 12 to integrated circuit 51 by reflective modulator 66, modulated light beam 64, and opto-electronic receiver 68.

It should be noted that the modulators and receivers shown in FIG. 4 can be interleaved so as to produce linear arrays of modulators and receivers, each parallel to the circuit edge similar to conventional input/output pad arrangements.

By now it should be appreciated that a unique optical interconnect system has been provided, which provides for efficient bidirectional data transfer between integrated circuits. High speed inter-circuit communication is facilitated by the efficiencies of optical interconnection. Because data transfer is bidirectional, there is no delay awaiting bus arbitration. By facilitating transfer of data between facing integrated circuits, the need to route data through a backplane is reduced, reducing the penalties of propagation delay and simultaneous switching noise.

I claim:

1. An optical interconnect system providing for the simultaneous bi-directional transfer of data, comprising:

an opto-electronic transmitter which simultaneously emits a continuous beam of light in a first direction and in a second direction;

a first holographic diffractive element placed in the path of the beam of light in the first direction, the first holographic element splitting the beam of light in the first direction into a first plurality of light beams, each one of the first plurality of light beams forming a first independent optical communication channel;

a second holographic diffractive element placed in the path of the beam of light in the second direction, the second holographic element splitting the beam of light in the second direction into a second plurality of light beams, each one of the second plurality of light beams forming a second independent optical communication channel;

a first plurality of reflective modulators, wherein each reflective modulator is placed in the path of each first independent optical communication channel, the reflectivity of the reflective modulators being modulated in response to data input from an integrated circuit, the reflective modulators thereby each selectively reflecting a respective light beam;

a second plurality of reflective modulators, wherein each reflective modulator is placed in the path of each second independent optical communication channel, the reflectivity of the reflective modulators being modulated in response to data input from an integrated circuit, the reflective modulators thereby each selectively reflecting a respective light beam;

a first plurality of opto-electronic receivers, there being one opto-electronic receiver corresponding to each first reflective modulator, each of the first plurality of opto-electronic receivers being placed in the path of the light beam reflected by its corresponding reflective modulator;

a second plurality of opto-electronic receivers, there being one opto-electronic receiver corresponding to each second reflective modulator, each of the second plurality of opto-electronic receivers being placed in the path of the light beam reflected by its corresponding reflective modulator;

a first plurality of holographic focus elements, wherein each one of the first plurality of holographic focus elements is placed in the path of each light beam reflected by the first plurality of reflective modulators so as to focus each reflected light beam onto the corresponding first opto-electronic receiver; and a second plurality of holographic focus elements, wherein each one of the second plurality of holographic focus elements is placed in the path of each light beam reflected by the second plurality of reflective modulators so as to focus each reflected light beam onto the corresponding second opto-electronic receiver.

2. The optical interconnect system of claim 1 wherein the opto-electronic transmitter is mounted within an optically transparent support medium which comprises:

a first optically transparent layer, having a first side and a second side, the opto-electronic transmitter being attached to the first side of the first optically transparent layer such that the continuous beam of light emitted in the first direction passes from the opto-electronic transmitter through the first optically transparent layer to the second side of the first optically transparent layer;

a second optically transparent layer, having a first side and a second side, the first side of the second optically transparent layer being attached to the first side of the first optically transparent layer such that the continuous beam of light emitted in the second direction passes from the opto-electronic transmitter through the second optically transparent layer to the second side of the second optically transparent layer;

a third optically transparent layer, having a first side and a second side, the first side of the third optically transparent layer being attached to the second side of the first optically transparent layer, the first holographic diffractive element and the second plurality of holographic focus elements being incorporated into the interface between the first optically transparent layer and the third optically transparent layer; and a fourth optically transparent layer, having a first side and a second side, the first side of the fourth optically transparent layer being attached to the second side of the second optically transparent layer, the second holographic diffractive element and the first plurality of holographic focus elements being incorporated into the interface between the second optically transparent layer and the fourth optically transparent layer.

3. The optical interconnect system of claim 2 wherein the first plurality of reflective modulators and the second plurality of opto-electronic receivers are attached to the second side of the third optically transparent layer, the first plurality of reflective modulators and the second plurality of opto-electronic receivers being coupled to a first integrated circuit.

4. The optical interconnect system of claim 3 wherein the second plurality of reflective modulators and the first plurality of opto-electronic receivers are attached to the second side of the fourth optically transparent layer, the second plurality of reflective modulators and the first plurality of opto-electronic receivers being coupled to a second integrated circuit.

5. The optical interconnect system of claim 2 wherein the first plurality of reflective modulators and the second plurality of opto-electronic receivers are attached to a first integrated circuit, the first integrated circuit being coupled to the second side of the third optically transparent layer.

6. The optical interconnect system of claim 5 wherein the second plurality of reflective modulators and the first plurality of opto-electronic receivers are attached to a second integrated circuit, the second integrated circuit being coupled to the second side of the fourth optically transparent layer.

7. An optical interconnect system providing for the simultaneous bidirectional transfer of data between two integrated circuits, comprising:

a first array of reflective modulators coupled to the surface of a first integrated circuit;

a first array of opto-electronic receivers coupled to the surface of the first integrated circuit;

a second array of reflective modulators coupled to the surface of a second integrated circuit;

a second array of opto-electronic receivers coupled to the surface of the second integrated circuit;

a bidirectional opto-electronic transmitter positioned between the first and second integrated circuits such that a first beam of light is emitted by the opto-electronic transmitter in the direction of the first integrated circuit, and a second beam of light is emitted by the opto-electronic transmitter in the direction of the second integrated circuit;

a first holographic diffractive element placed in the path of the first beam of light, the first holographic diffractive element splitting the first beam of light into a first array of light beams, the first array of light beams being focused by the first holographic diffractive element upon the first array of reflective modulators, the first array of light beams thus being selectively reflected by the first array of reflective modulators;

a second holographic diffractive element placed in the path of the second beam of light, the second diffractive holographic element splitting the second beam of light into a second array of light beams, the second array of light beams being focused by the second holographic diffractive element upon the second array of reflective modulators, the second array of light beams thus being selectively reflected by the second array of reflective modulators;

a first array of holographic focus elements placed in the path of the reflected first array of light beams so as to focus the reflected first array of light beams onto the second array of opto-electronic receivers; and a second array of holographic focus elements placed in the path of the reflected second array of light beams so as to focus the reflected second array of light beams onto the first array of opto-electronic receivers.

8. The optical interconnect system of claim 7 wherein the opto-electronic transmitter, first and second holographic diffractive elements, and first and second arrays of holographic focus elements are mounted within an optically transparent support structure, the first and second arrays of reflective modulators and first and second arrays of opto-electronic receivers being attached to the first and second integrated circuits, the first and second integrated circuits being coupled to the optically transparent support structure.

9. The optical interconnect system of claim 7 wherein the opto-electronic transmitter, first and second holographic diffractive elements, first and second arrays of holographic focus elements, first and second arrays of reflective modulators, and first and second arrays of opto-electronic receivers are mounted within an optically transparent support structure, the first and second integrated circuits being coupled to the optically transparent support structure.

10. A method for providing simultaneous bidirectional interconnection between a pair of integrated circuits, comprising:
generating a pair of beams of light which respectively travel in a first and a second direction;
splitting each of the beams of light into arrays of light beams by using a diffractive element;
reflecting the arrays of light beams off of reflective modulators;
modulating the reflected arrays of light beams with data input to the reflective modulators from the pair of integrated circuits; and
focusing the reflected arrays of light beams upon opto-electronic receivers by using a holographic focus element.

11. An optical interconnect system for optically transferring data between a first and a second integrated circuit, comprising:
means for providing a first and a second light beam;
a first diffractive element for splitting the first light beam into a first plurality of light beams;
a first plurality of means for modulating and reflecting each of the first plurality of light beams, the first plurality of means for modulating and reflecting being coupled to the first integrated circuit;
a first holographic focus element for focusing the modulated first plurality of light beams;
a first plurality of means for receiving each of the modulated and focused first plurality of light beams, the first plurality of means for receiving being coupled to the second integrated circuit, wherein the first plurality of modulated and reflected light beams carry data from the first integrated circuit to the second integrated circuit;
a second diffractive element for splitting the second light beam into a second plurality of light beams;
a second plurality of means for modulating and reflecting each of the second plurality of light beams, the second plurality of means for modulating and reflecting being coupled to the second integrated circuit;
a second holographic focus element for focusing the modulated second plurality of light beams; and
a second plurality of means for receiving each of the modulated and focused second plurality of light beams, the second plurality of means for receiving being coupled to the first integrated circuit, wherein the second plurality of modulated and reflected light beams carry data from the second integrated circuit to the first integrated circuit.

12. The optical interconnect system of claim 11 wherein the means for providing a first and second light beam is a laser.

13. The optical interconnect system of claim 11 wherein the first and second diffractive elements for splitting the first and second light beams are holographic focus elements.

* * * * *